UNITED STATES PATENT OFFICE.

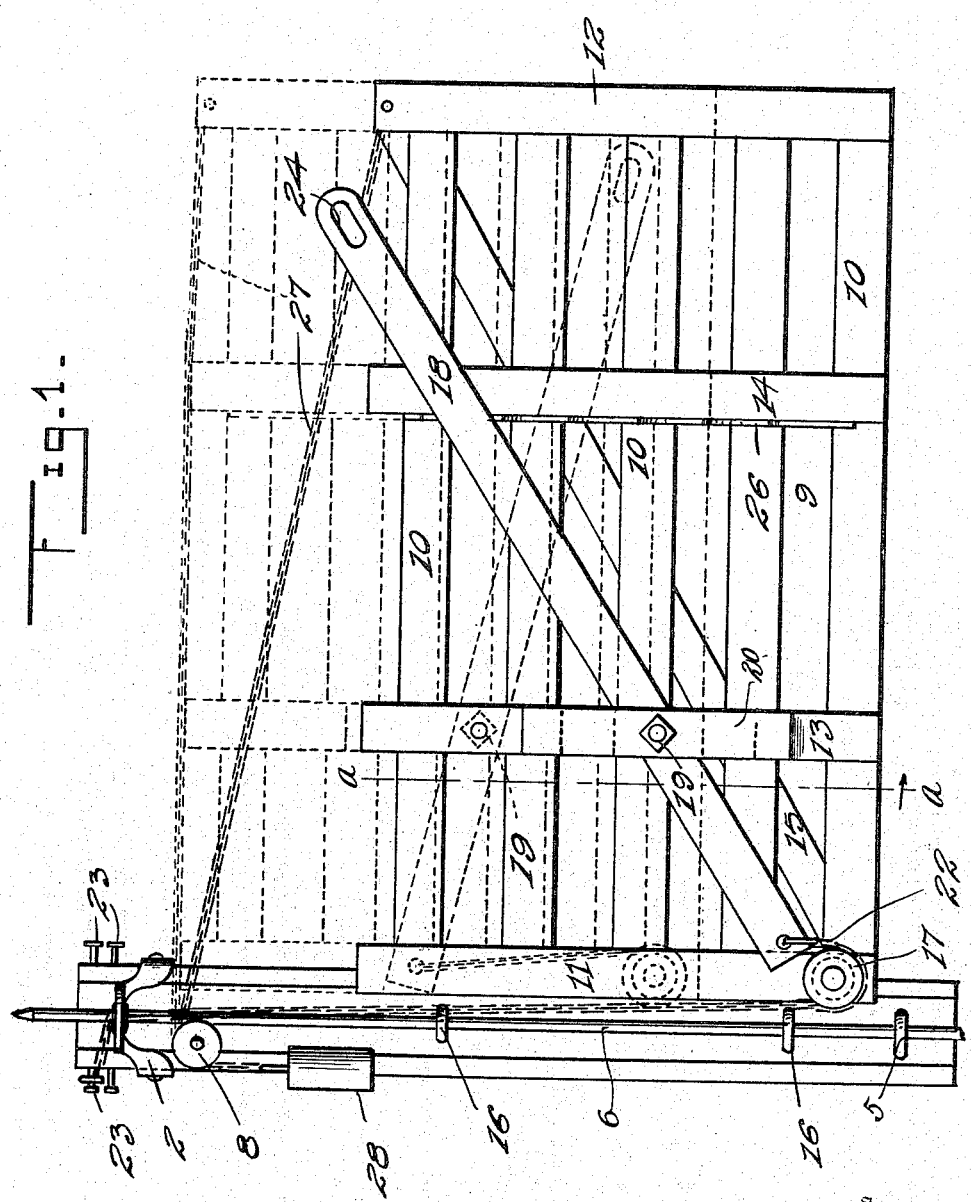

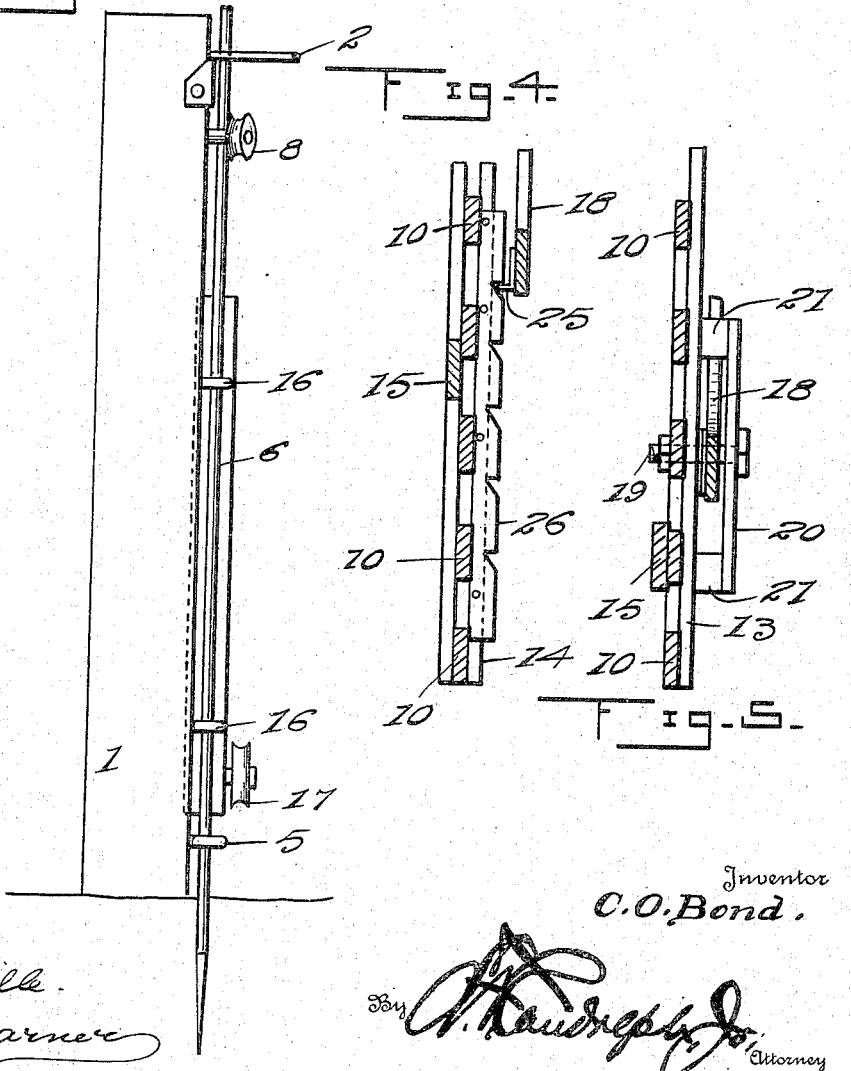

CALVIN O. BOND, OF COLUMBUS JUNCTION, IOWA.

GATE.

1,168,997. Specification of Letters Patent. Patented Jan. 18, 1916.

Application filed May 26, 1915. Serial No. 30,601.

*To all whom it may concern:*

Be it known that I, CALVIN O. BOND, a citizen of the United States, residing at Columbus Junction, in the county of Louisa and State of Iowa, have invented certain new and useful Improvements in Gates; and I do hereby declare the following to be a full, clear, and exact description of the invention, such as will enable others skilled in the art to which it appertains to make and use the same.

This invention relates to improvements in swinging gates; the object of my invention being to provide an improved gate of this kind which is also adapted to be raised and lowered and is provided with raising and lowering means, so that the gate may be set at any desired elevation, to clear and move over snow or to permit the passage of small animals under the gate, while preventing the passage of larger animals, or as may be desired.

The invention consists in the construction, combination and arrangement of devices hereinafter described and claimed.

In the accompanying drawings: Figure 1 is a side elevation of a gate constructed in accordance with my invention, and showing the same in open position, and in lowered position in full lines, and in raised position in dotted lines. Fig. 2 is a plan of the same. Fig. 3 is a detail side elevation of the pivoting post and its connections. Fig. 4 is a detail vertical sectional view of the gate, and showing its locking rack and adjusting lever. Fig. 5 is a detail sectional view of the same on the plane indicated by the line *a—a* of Fig. 1.

The pivoting post is indicated at 1 and in accordance with my invention is provided on its inner side, near its upper end, with a bracket 2, which has spaced openings 3—4. The post 1 is also provided with an eye bolt 5, the eye of which projects horizontally from the inner side of said post. A vertically arranged pivoting or hinge bar 6 has its upper end passed through the opening 3, its lower portion passed through the eye bolt 5 and its lower end driven into the ground. Near the upper end of the post 1, on its inner side, is an obliquely arranged arm 7 providing a supporting bearing for a pulley 8.

The gate 9 may, in accordance with my invention, be of any suitable construction and is here shown as comprising horizontally arranged bars 10, vertical inner and outer end bars 11—12 and vertical intermediate bars 13—14. The gate is also shown as having an inclined brace bar 15. At the inner end of the gate are eye bolts 16, the eyes of which are engaged by the pivoting bar 6, the said eye bolts co-acting with said pivoting bar to mount the gate for swinging movement and also for vertical movement, and adapting the gate to be raised and lowered as desired. The gate is provided on one side near its lower inner corner with a pulley 17. It is also provided with a lever bar 18. Said lever bar is pivotally mounted, on a bolt 19, between the vertical bar 13 and a guide bar 20, blocks 21 being secured between the ends of said guide bar and said bar 13, as shown in detail in Fig. 5. The inner end of the lever bar 18 is provided with a chain, cord, or other like flexible element 22, which engages under the pulley 17 and then passes upwardly through the opening 4 in the bracket 2 and has its upper end attached to a suitable headed stud 23 on the post 1, as shown in Figs. 1 and 2. The free end of the lever bar 18 is provided with a hand slot 24 to enable it to be readily grasped and operated.

It will be understood that by drawing downwardly on the free end of the bar 18 the chain 22 will co-act with the pulley 17 to raise the gate, as indicated in dotted lines in Fig. 1, and by raising the free end of said lever bar the gate may be lowered at will. To secure the lever bar in position, and with the gate adjusted as desired, I provide the lever bar with a toothed or flange plate 25 on its inner side and I also provide a vertically arranged rack plate 26, which is secured to one side of one of the intermediate vertical bars 14. The toothed plate 25 may be engaged with the said rack plate at any desired adjustment, and as clearly indicated in Fig. 4.

To prevent the gate from sagging and to also partially counter-balance the same and facilitate the raising and lowering of the gate I provide a chain 27, which is attached to the upper outer corner of the gate, passes over the pulley 8 and is provided at its depending inner end with a counter-balancing weight 28.

What I claim is:

In a device of the class described comprising a post, a bracket provided with spaced apertures therein and secured to said post adjacent the top thereof, an eye secured to said post adjacent the lower end thereof, a hinged bar having its upper end passed through one of the apertures of said bracket and its opposite end passed through said eye and into engagement with the ground, a gate hingedly and slidably mounted upon said hinged bar, a pulley journaled on the lower corner of the gate adjacent the post, a lever bar pivotally secured to said gate, a chain attached to one end of said lever bar and passed under the pulley and through one of the apertures of said bracket, means for securing said chains to the top of the post and means for locking the lever bar in a desired position.

In testimony whereof I affix my signature in presence of two witnesses.

CALVIN O. BOND.

Witnesses:
WM. A. RICE,
WILL COSGRO.

Copies of this patent may be obtained for five cents each, by addressing the "Commissioner of Patents, Washington, D. C."